United States Patent
Rafferty et al.

(10) Patent No.: US 10,759,461 B2
(45) Date of Patent: Sep. 1, 2020

(54) MULTI-FUNCTION VEHICLE INPUT APPARATUSES WITH ROTATABLE DIALS FOR VEHICLE SYSTEMS CONTROL AND METHODS INCORPORATING THE SAME

(71) Applicant: Toyota Motor Engineering & Manufacturing North America, Inc., Plano, TX (US)

(72) Inventors: John Charles Rafferty, Dexter, MI (US); Lou M. Pope, Ypsilanti, MI (US); Clinton J. Williams, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/264,223

(22) Filed: Jan. 31, 2019

(65) Prior Publication Data
US 2020/0247456 A1    Aug. 6, 2020

(51) Int. Cl.
*G06F 3/045*    (2006.01)
*G06F 3/041*    (2006.01)
(Continued)

(52) U.S. Cl.
CPC ............... *B62D 1/046* (2013.01); *B60Q 9/00* (2013.01); *B60R 11/0264* (2013.01);
(Continued)

(58) Field of Classification Search
CPC .................................................. B62D 5/0463
See application file for complete search history.

(56) References Cited

U.S. PATENT DOCUMENTS

| 4,322,582 A | * | 3/1982 | Song | H04M 1/315 |
| | | | | 379/366 |
| 5,404,152 A | * | 4/1995 | Nagai | G06F 3/0362 |
| | | | | 345/157 |

(Continued)

FOREIGN PATENT DOCUMENTS

| JP | 2013129352 A | 7/2013 |
| KR | 100505873 B1 | 8/2005 |

(Continued)

OTHER PUBLICATIONS

Gonzalez, et al., "Eyes on the road, hands on the wheel: thumb-based interaction techniques for input on steering wheels", 2007 https://faculty.washington.edu/wobbrock/pubs/gi-07.pdf.

(Continued)

*Primary Examiner* — Nan-Ying Yang
(74) *Attorney, Agent, or Firm* — Dinsmore & Shohl LLP (57) ABSTRACT

A multi-function input apparatus of a steering wheel that includes an outer dial having a planar surface and a center dial having a capacitive surface such that the center dial is responsive to capacitive touch along the capacitive surface. The center dial being disposed within the outer dial and the outer dial is rotatable about a rotation axis independent of the center dial such that the center dial is rotatably fixed when the outer dial rotates. The outer dial including a recessed portion positioned along the planar surface such that the recessed portion is rotatable about the center dial. The recessed portion of the outer dial is translatable along the rotation axis.

20 Claims, 5 Drawing Sheets

(51) Int. Cl.
  *B62D 1/04* (2006.01)
  *B60R 16/027* (2006.01)
  *B60Q 9/00* (2006.01)
  *G05G 9/02* (2006.01)
  *B60R 11/02* (2006.01)
  *G06F 3/01* (2006.01)
  *G06F 3/044* (2006.01)
  *G06F 3/0482* (2013.01)
  *G06F 3/0354* (2013.01)
  *G06F 3/0484* (2013.01)
  *G06F 3/0362* (2013.01)
  *B60R 11/00* (2006.01)

(52) U.S. Cl.
  CPC ............ *B60R 16/027* (2013.01); *G05G 9/02* (2013.01); *G06F 3/016* (2013.01); *G06F 3/0362* (2013.01); *G06F 3/03547* (2013.01); *G06F 3/044* (2013.01); *G06F 3/0482* (2013.01); *G06F 3/04847* (2013.01); *B60R 2011/001* (2013.01)

(56) References Cited

U.S. PATENT DOCUMENTS

| | | |
|---|---|---|
| 9,092,093 B2 | 7/2015 | Jubner et al. |
| 9,207,856 B2 | 12/2015 | Imai |
| 2015/0121274 A1* | 4/2015 | Kishimoto ............ B60K 37/06 715/771 |
| 2018/0170182 A1* | 6/2018 | Choi .................... B60K 37/06 |
| 2018/0273050 A1 | 9/2018 | Tertoolen et al. |

FOREIGN PATENT DOCUMENTS

| | | |
|---|---|---|
| KR | 20160014962 A | 2/2012 |
| WO | 2014021063 A1 | 2/2014 |

OTHER PUBLICATIONS

Marks, "Touchpad steering wheel keeps eyes on the road", Dec. 12, 2012 https://www.newscientist.com/article/mg21628956-100-touchpad-steering-wheel-keeps-eyes-on-the-road/.

\* cited by examiner

MULTI-FUNCTION VEHICLE INPUT APPARATUSES WITH ROTATABLE DIALS FOR VEHICLE SYSTEMS CONTROL AND METHODS INCORPORATING THE SAME

TECHNICAL FIELD

The present specification generally relates to input devices for controlling various vehicle systems and processes, and more specifically, to a multi-function input apparatus that provides a central control location for operating various vehicle systems and that includes rotatable dials for operational control of the vehicle systems.

BACKGROUND

Vehicles generally include numerous systems, devices, and apparatuses on-board for use by occupants of the vehicle. For example, vehicles may generally include audio systems, communication devices, navigation apparatuses, cabin temperature systems, and the like. Such systems, devices, and apparatuses may generally include an abundance of settings, functionality, and selective controls that may be interacted with and/or adjusted by an occupant of the vehicle. These systems, devices, and apparatuses may generally require numerous input apparatuses within the vehicle for controlling their respective operation. Due to the varying functionality of such systems, devices, and apparatuses, an occupant of the vehicle may be required to perform complicated operation of input apparatuses to provide the desired control of the vehicle systems, devices, and apparatuses.

By engaging in extensive operation of an input apparatus, an occupant of the vehicle, such as an operator (e.g., driver), may be required to divert her attention from operating the vehicle in order to actuate the input apparatus to adequately control a vehicle system, device, or apparatus and/or to determine a relative desired setting with respect to the particular vehicle system, device, or apparatus being controlled. Diverting attention from operating the vehicle may generally entail an occupant diverting her eyes from a front of the vehicle, removing her hands from an apparatus controlling operation of the vehicle (e.g., a steering wheel), and/or other activities that may impair an occupant's uninterrupted control of the vehicle. Providing an input apparatus that facilitates an operation of multiple vehicle systems, devices, and/or apparatuses and a selective control of their corresponding settings and/or functionality may generally promote an uninterrupted control of the vehicle.

SUMMARY

In one embodiment, a multi-function input apparatus of a steering wheel comprising an outer dial having a planar surface and a center dial having a capacitive surface such that the center dial is responsive to capacitive touch along the capacitive surface. The center dial being disposed within the outer dial and the outer dial is rotatable about a rotation axis independent of the center dial such that the center dial is rotatably fixed when the outer dial rotates. The outer dial including a recessed portion positioned along the planar surface such that the recessed portion is rotatable about the center dial. The recessed portion of the outer dial is translatable along the rotation axis.

In another embodiment, a steering wheel of a vehicle comprising an outer rim, a center hub disposed within the outer rim, and an input apparatus positioned on the center hub. The input apparatus including an outer dial and a center dial disposed within the outer dial, the center dial including a haptic touch pad that is responsive to contact and the center dial being translatable toward the center hub. The outer dial is rotatable relative to and independent of the center dial, the outer dial is translatable toward the center hub independent of the center dial, and the outer dial includes a recessed portion that is depressed inwardly relative to the center dial. A plurality of vehicle system are navigable in response to contact with the capacitive surface of the center dial and selectable in response to translation of the center dial. Settings of the vehicle system are navigable in response to rotation of the recessed portion and selectable in response to translation of the recessed portion.

In another embodiment, a multi-function input apparatus of a vehicle comprising a center dial positioned on a steering wheel of the vehicle, the center dial including a haptic touch pad that is selectively actuated in response to contact with the haptic touch pad. The apparatus comprising an outer dial positioned about the center dial such that the center dial is encapsulated by the outer dial, the outer dial being rotatable about the center dial such that center dial is rotatably fixed relative to the outer dial when the outer dial rotates. The outer dial including a recessed portion that is rotatable simultaneously with the outer dial and depressible relative to the center dial. The apparatus further comprising a processor and non-transitory computer-readable medium storing computer-readable instructions that, when executed, cause the processor to actuate a vehicle system in response to the center dial receiving contact along the haptic touch pad. The processor further navigates a plurality of settings of the vehicle system in response to the outer dial rotating independent of the center dial, and selects at least one of the plurality of settings in response to the recessed portion being depressed relative to the center dial.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are generally directed to multi-function input apparatuses that may provide vehicle support control for an occupant of a vehicle, and in particular, selective control and operation of one or more devices or systems of the vehicle at a central location within a passenger cabin of the vehicle. For example, the multi-function input apparatus may be positioned along a steering wheel of the vehicle such that the input apparatus is centrally located near an operator of the vehicle to facilitate ease of access. Vehicle devices or systems that may be controlled by the multi-function input apparatus of the present disclosure may include, for example, an HVAC device, an audio system, a visual interface or heads-up display, a communication module, and the like. A manual actuation of the multi-function input apparatus may provide a selective activation of various vehicle systems and may further provide elaborate navigation and/or control of a plurality of settings corresponding to the vehicle system that is actuated. The multi-function input apparatus may generally include a touch pad surface disposed within a circular dial that includes a recessed portion for improving a reference, control and manipulation of the input apparatus.

One non-limiting example of a multi-function input apparatus includes an outer dial having a planar surface and a center dial having a capacitive surface such that the center dial is responsive to capacitive touch. The center dial of the multi-function input apparatus is disposed within the outer dial of the multi-function input apparatus. The outer dial of the multi-function input apparatus is rotatable about a rotation axis, independent of the center dial the multi-function input apparatus such that the center dial is rotatably fixed when the outer dial rotates. The outer dial of the multi-function input apparatus includes a recessed portion positioned along the planar surface of the outer dial, such that the recessed portion is rotatable about the center dial of the multi-function input apparatus. Further, the recessed portion of the outer dial is translatable along the rotation axis.

Although embodiments herein are described in the context of multi-function input apparatuses controlling various vehicle systems or devices for automotive vehicles, embodiments are not limited thereto. For example, the multi-function input apparatuses described herein may be configured and compatible for use with various transportation systems, including, for example, motorcycles, bicycles, watercrafts, aircrafts, and/or the like. Other uses should generally be understood and are included within the scope of the present disclosure.

Figure 1:
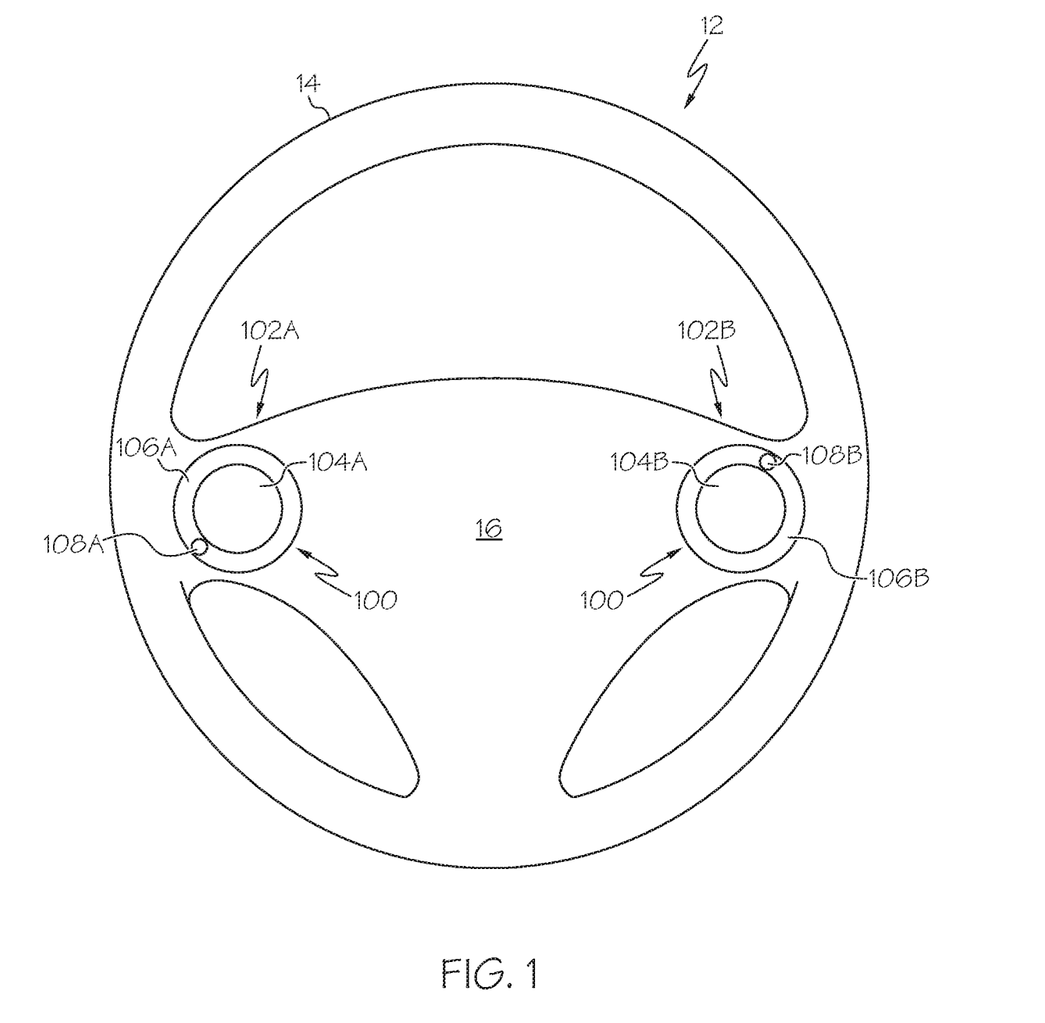
FIG. 1 schematically depicts an illustrative input apparatus positioned on a steering wheel of a vehicle, the input apparatus including an outer dial disposed about a center dial according to one or more embodiments shown and described herein.
Figure 5:
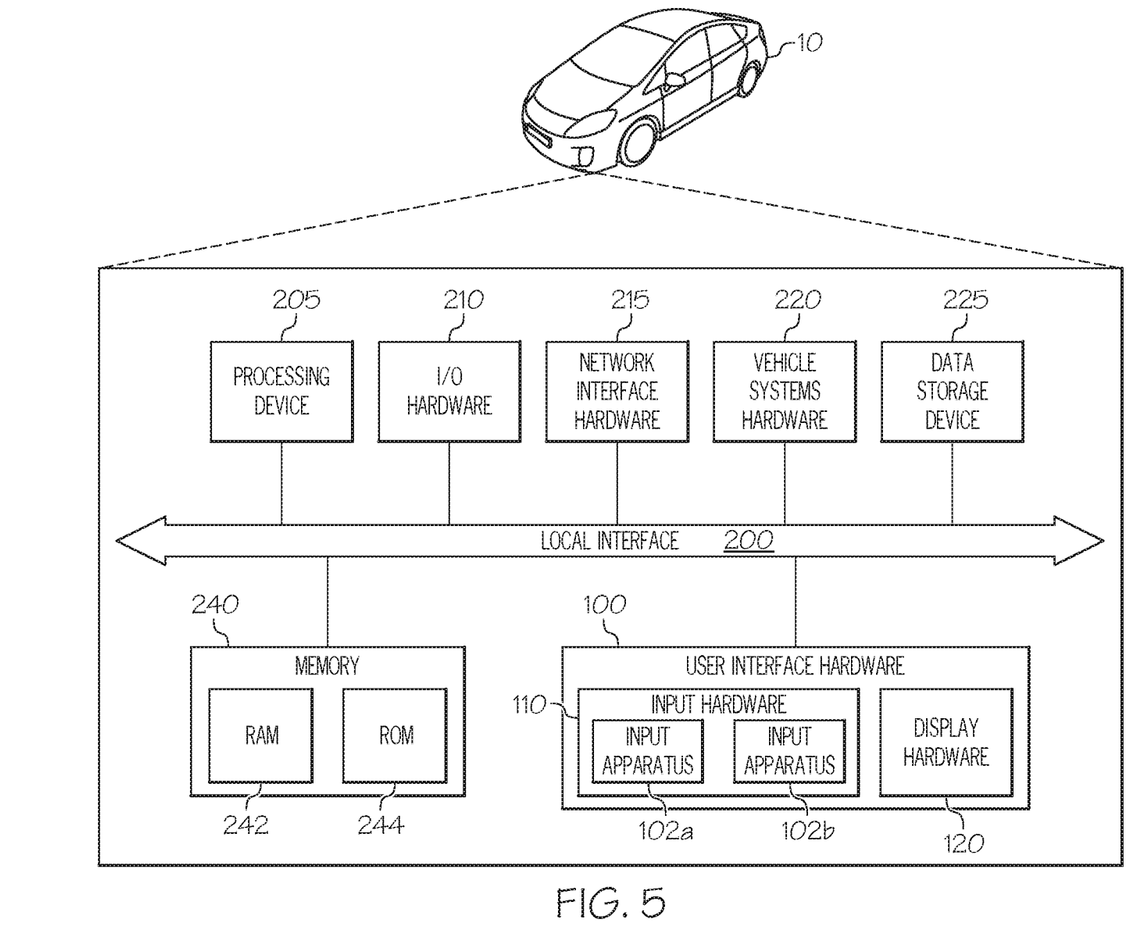
FIG. 5 schematically depicts illustrative hardware components of an illustrative vehicle including the input appa- FIG. 6 schematically depicts the input apparatus of FIG. 1 communicatively coupled to one or more displays in a vehicle according to one or more embodiments shown and described herein.

Referring now to the drawings, FIG. 1 generally depicts a steering wheel 12 of a vehicle 10 (FIG. 5) including one or more user interface hardware 100 positioned thereon. In particular, illustrative input apparatuses 102A, 102B (i.e., user interface hardware 100) are depicted in FIG. 1 along a center hub 16 of the steering wheel 12. The input apparatuses 102A, 102B are positioned within an outer rim 14 of the steering wheel 12 along regions of the center hub 16 where an occupant of the vehicle 10, and in particular an operator of the vehicle 10, generally grasps the steering wheel 12 to operate the vehicle 10. In the present example, the steering wheel 12 includes a pair of input apparatuses 102A, 102B positioned along the center hub 16 at locations corresponding to a location where an operator's thumbs may generally be positioned when grasping the outer rim 14 of the steering wheel 12. It should be understood that the pair of input apparatuses 102A, 102B may be positioned along various other regions of the center hub 16, the steering wheel 12 (e.g., the outer rim 14), and/or other surfaces within a passenger cabin of the vehicle 10 (FIG. 5). For example, one or more input apparatuses 102A, 102B may be positioned adjacent to a front passenger seat of the vehicle 10, a rear passenger seat of the vehicle 10, and the like.

It should be further understood that in other embodiments the steering wheel 12 may include additional or fewer input apparatuses 102A, 102B than those shown and depicted herein. Additionally, the steering wheel 12 of the vehicle 10 may include other user interface hardware 100 (e.g., input hardware 110) positioned thereon in addition to the input apparatuses 102A, 102B described herein. It should be understood that the input apparatuses 102A, 102B described and depicted herein are substantially similar to one another except for the differences explicitly noted herein.

Still referring to FIG. 1, the input apparatus 102A includes a center dial 104A and an outer dial 106A. The outer dial 106A of the input apparatus 102A extends about the center dial 104A such that the center dial 104A is disposed within and encapsulated by the outer dial 106A. The outer dial 106A of the present examples includes a circular profile, however, it should be understood that the outer dial 106A may have various other profiles, shapes, or sizes without departing from a scope of the present disclosure. The outer dial 106A of the input apparatus 102A further includes a recessed portion 108A positioned along a planar surface 107 (FIGS. 2-4) of the outer dial 106A. In the present example, the recessed portion 108A is sized and shaped to receive at least a finger of an occupant therein such that the recessed portion 108A is configured to facilitate selective actuation of the outer dial 106A. In particular, the recessed portion 108A of the input apparatus 102A is sized and shaped to be grasped by an occupant, such as, for example, by a finger of an occupant's hand, to facilitate a rotation of the outer dial 106A about the center dial 104A. As described in greater detail herein, the center dial 104A and the outer dial 106A of the input apparatus 102A may be selectively actuated by an operator of the vehicle 10 to initiate control of one or more vehicle systems or devices of the vehicle 10.

The input apparatus 102B includes a center dial 104B and an outer dial 106B. The outer dial 106B of the input apparatus 102B extends about the center dial 104B such that the center dial 104B is disposed within and encapsulated by the outer dial 106B. The outer dial 106B of the present examples includes a circular profile, however, it should be understood that the outer dial 106B may have various other profiles, shapes, or sizes without departing from a scope of the present disclosure. The outer dial 106B of the input apparatus 102B further includes a recessed portion 108B positioned along the planar surface 107 (FIGS. 2-4) of the outer dial 106B. In the present example, the recessed portion 108B is sized and shaped to receive at least a finger of an occupant therein such that the recessed portion 108B is configured to facilitate selective actuation of the outer dial 106B. In particular, the recessed portion 108B of the input apparatus 102B is sized and shaped to be grasped by an occupant, such as, for example, by a finger of an occupant's hand, to facilitate a rotation of the outer dial 106B about the center dial 104B. As described in greater detail herein, the center dial 104B and the outer dial 106B of the input apparatus 102B may be selectively actuated by an operator of the vehicle 10 to initiate control of one or more vehicle systems or devices of the vehicle 10.

Figure 2:
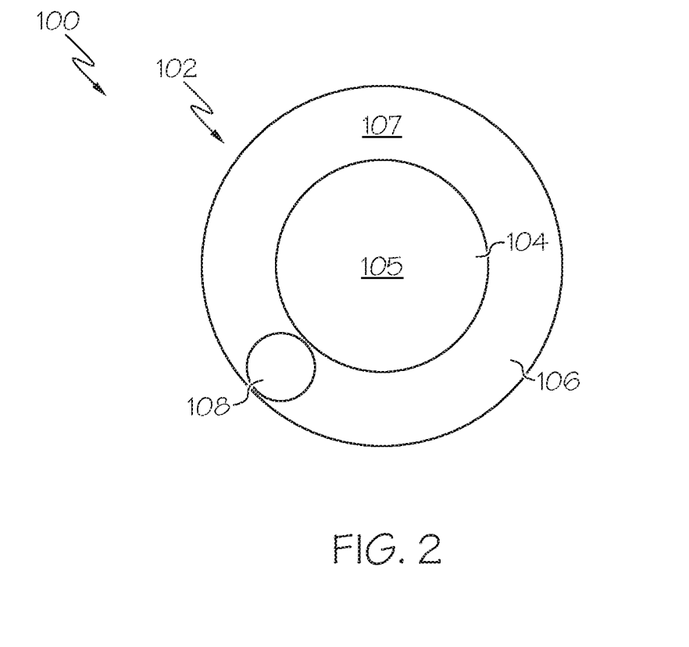
FIG. 2 schematically depicts the input apparatus of FIG. 1 with the center dial including a capacitive touch surface according to one or more embodiments shown and described herein.
Figure 3:
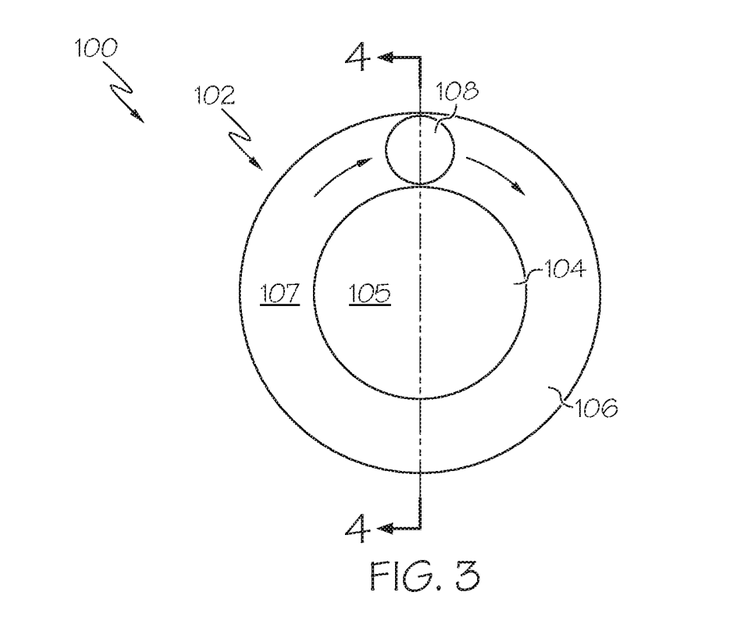
FIG. 3 schematically depicts illustrative methods of actuating the input apparatus of FIG. 1 by rotating the outer dial according to embodiments shown and described herein.
Figure 4:
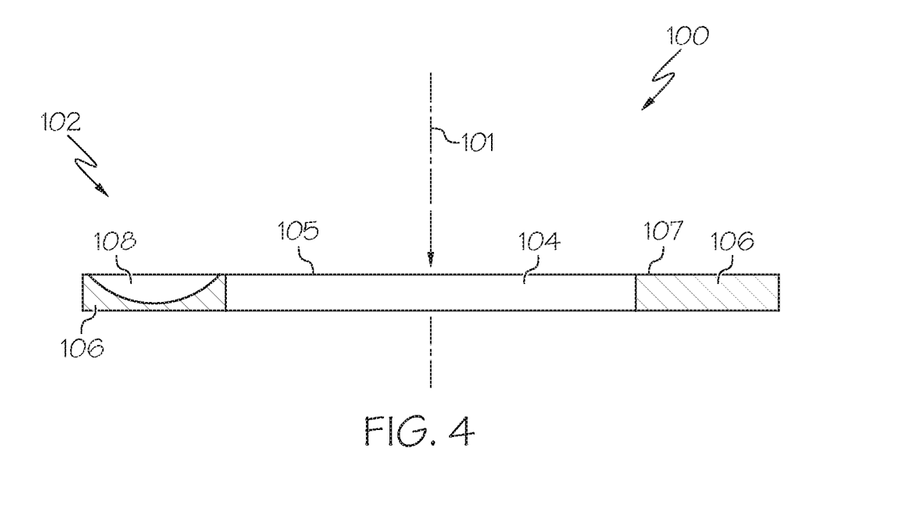
FIG. 4 schematically depicts a cross-sectional view of the input apparatus of FIG. 3 with the outer dial including a recessed portion according to one or more embodiments shown and described herein.

Additional description of the input apparatuses 102A, 102B will be provided with respect to FIGS. 2-4, in which no distinction is made between the input apparatus 102A and the input apparatus 102B, but instead an input apparatus 102 corresponding to each of the input apparatus 102A and the input apparatus 102B is described.

Referring now to FIGS. 2 and 3, the center dial 104 of the input apparatus 102 is a touch pad that includes a capacitive touch surface 105 extending thereon. Accordingly, the center dial 104 of the input apparatus 102 is responsive to a capacitive touch received thereon by an occupant. In other embodiments, the center dial 104 of the input apparatus 102 may include a haptic touch pad, a touch sensor, and/or the like. The center dial 104 is configured to detect contact between the capacitive surface 105 of the center dial 104 and an occupant, such as, for example, a finger of an occupant's hand received thereon. The outer dial 106 of the input apparatus 102 is selectively rotatable along the center hub 16 of the steering wheel 12 in a plurality of directions. In particular, the outer dial 106 of the input apparatus 102 is rotatable about the center dial 104 and a rotation axis 101. The outer dial 106 of the input apparatus 102 is rotatable along the center hub 16 of the steering wheel 12 independent of the center dial 104 of the input apparatus 102. Accordingly, the center dial 104 of the input apparatus 102 is rotatably fixed to the center hub 16 of the steering wheel 12.

With recessed portion 108 positioned along the planar surface 107 of the outer dial 106, rotation and/or translation of the outer dial 106 provides for a simultaneous rotation and/or translation of the recessed portion 108. In the present example, the outer dial 106 of the input apparatus 102 may selectively rotate about the center dial 104 in at least a clockwise direction and a counterclockwise direction without providing a physical manipulation of the center dial 104 disposed therein. It should be understood that the outer dial 106 and/or the recessed portion 108 of the input apparatus 102 may be rotatable in alternative, additional, and/or fewer directions than those shown and described herein. For instance, the input apparatus 102 may include a singular-rotation base such that the outer dial 106 and the recessed portion 108 are only translatable in a single direction (e.g., clockwise) relative to the center hub 16 of the steering wheel 12 (FIG. 1) and about the rotation axis 101. In some embodiments, the input apparatus 102 generates a tactile and/or audible feedback in response to a rotation of the outer dial 106. In this instance, an occupant of the vehicle 10 may detect and perceive a progressive rotation of the outer dial 106 of the input apparatus 102 in response to the tactile and/or audible feedback generated as a result thereof.

Referring to FIG. 3, upon rotating the outer dial 106 of the input apparatus 102 in at least one direction relative to a default position, an occupant may release the outer dial 106 and in some embodiments the outer dial 106 of the input apparatus 102 may be resiliently biased to return to the default position. In this instance, the outer dial 106 of the input apparatus 102 is required to be physically maintained in position by an occupant in order to continue control of a respective vehicle system hardware 220 (FIG. 5). Accordingly, releasing the outer dial 106 of the input apparatus 102 may effectively terminate a corresponding control of the vehicle system hardware 220 (FIG. 5). In other embodiments, the outer dial 106 may remain in the rotated position despite a release of the outer dial 106 by an occupant.

Referring now to FIG. 4, a cross-sectional view of the input apparatus 102 of FIG. 3 is depicted with the center dial 104 including the capacitive surface 105 and the outer dial 106 including a planar surface 107. It should be understood that in some embodiments, the outer dial 106 is positioned relatively above the center dial 104 such that the planar surface 107 of the outer dial 106 is offset from the capacitive surface 105 of the center dial 104. In this instance, an interface between the center dial 104 and the outer dial 106 forms an edge therein that may be physically perceivable by an occupant when actuating (i.e., contacting) the center dial 104 and/or the outer dial 106. In the present example, the recessed portion of the outer dial 106 is depressed inwardly relative to the planar surface 107 of the outer dial 106. Accordingly, the recessed portion 108 extends effectively inward toward the center hub 16 of the steering wheel 12 (FIG. 1) thereby forming a cavity therein. It should be understood that with the planar surface 107 of the outer dial 106 and the capacitive surface 105 of the center dial 104 disposed about the recessed portion 108, a location of the recessed portion 108 may be easily identified by an occupant of the vehicle 10 by contacting the input apparatus 102 and detecting the relative depression and/or cavity formed by the recessed portion 108 surrounding the adjacent planar surfaces 105, 107 of the dials 104, 106.

In some embodiments, the center dial 104 and/or the outer dial 106 of the input apparatus 102 may be selectively translatable along and/or parallel to the rotation axis 101. In this instance, the center dial 104 and/or the outer dial 106 of the input apparatus 102 translates toward (i.e., into) and away (i.e., outward) relative to the center hub 16 of the steering wheel 12 (FIG. 1). In particular, the outer dial 106 may translate along the rotation axis 101 in response to applying a predetermined force at the recessed portion 108. In this instance, depressing the recessed portion 108 provides a simultaneous translation of the outer dial 106. Similarly, depressing the capacitive surface 105 of the center dial 104 provides for a simultaneous translation of the center dial 104. It should be understood that the center dial 104 and the outer dial 106 are selectively translatable along the rotation axis 101 independent of one another. In some embodiments, the outer dial 106 of the input apparatus 102 may include a capacitive touch surface disposed thereon such that the outer dial 106 is responsive to conductive touch by an occupant, and in particular by a hand of an occupant received thereon. In this embodiment, actuation of the outer dial 106 may be provided by engaging the capacitive touch surface of the outer dial 106 with a hand of an occupant along a portion of the outer dial 106 that does not include the recessed portion 108.

Referring now to FIG. 5, illustrative hardware components of the vehicle 10 are schematically depicted. The hardware components of the vehicle 10 may be used to provide a functionality of one or more input apparatuses 102 described in further detail herein. Generally, the illustrative input apparatuses 102A, 102B depicted in FIG. 1 may be positioned within a vehicle 10 and provide particular use in assisting occupants of the vehicle 10 in controlling the vehicle 10 and/or various vehicle systems of the vehicle 10. However, it should be appreciated that the vehicle 10 is not limited to this use and may be used for other purposes without departing from the scope of the present disclosure.

The example vehicle 10 including the illustrative input apparatuses 102A, 102B generally includes a non-transitory computer-readable medium containing one or more programming instructions for completing the various processes described herein, which may be embodied as hardware, software, and/or firmware, according to embodiments shown and described herein. While in some embodiments the various components of the vehicle 10 may be configured as a general purpose computer with the requisite hardware, software, and/or firmware, in other embodiments, the various components of the vehicle 10 may also be configured as a special purpose computer designed specifically for performing the functionality described herein.

Still referring to FIG. 5, the vehicle 10 may include the user interface hardware 100, such as the input hardware 110 described above (including the input apparatus 102A and the input apparatus 102B), a processing device 205, I/O hardware 210, network interface hardware 215, vehicle systems hardware 220, a data storage device 225, and a non-transitory memory component 240. A local interface 200, such as a bus or the like, may interconnect the various components. The user interface hardware 100 may include any device, mechanism, system, interactive display, and/or various other hardware components for communicating information from an occupant to the vehicle 10, and in particular the one or more systems within the vehicle 10 (e.g., network interface hardware 215, vehicle systems hardware 220, and the like). For example, the user interface hardware 100 may include input hardware 110, such as the input apparatus 102 described above, a touch screen, button, microphone, and/or other device for receiving inputs from an occupant. The user interface hardware 100 may further include display hardware 120, such as, for example, a video card, heads-up display 122 (FIG. 6), dashboard display 124 (FIG. 6), console display 126 (FIG. 6), mirror display, and/or other device for sending or presenting visual data to a user. In some embodiments, the user interface hardware 100 may incorporate audio output hardware that generates and presents audible data to a user, such as, for example, spoken words, tones, music, and/or the like. It should be understood that the user interface hardware 100 may be integrated with the vehicle 10 in various other forms as described in more detail herein. It should further be understood that with an inclusion of the one or more input apparatus 102A, 102B of the present disclosure in the vehicle 10, fewer user interface hardware 100, and in particular fewer input hardware 110, may be required due to a plurality of vehicle systems effectively controlled at the input apparatus 102A, 102B.

The processing device 205, such as a computer processing unit (CPU), may be the central processing unit of the vehicle 10, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 225 and/or the memory component 240). The I/O hardware 210 may communicate information between the local interface 200 and one or more other components of the vehicle 10. For example, the I/O hardware 210 may act as an interface between the various components described with respect to FIG. 5 and other components of the vehicle 10, such as user interface hardware 100 (e.g., the input apparatus 102) that controls information communicated by an occupant of the vehicle 10 to vehicle systems hardware 220, network interface hardware 215, and the like for purposes of controlling an operation of various systems within the vehicle 10. The I/O hardware 210 may be utilized to transmit one or more commands from the input apparatus 102 to the other components of the vehicle 10 in some embodiments.

Still referring to FIG. 5, the network interface hardware 215 may include any wired or wireless networking hardware, such as a modem, LAN port, wireless fidelity (Wi-Fi) card, WiMax card, mobile communications hardware, and/or other hardware for communicating with other networks and/or devices. The vehicle systems hardware 220 may be one or more hardware components for providing a particular functionality or operation of the vehicle 10. For example, the vehicle systems hardware 220 may include a heating, ventilation and air conditioning (HVAC) system, a seat adjustment mechanism, a window, a mirror (e.g., side, rear, etc.), a Global Positioning System (GPS), an internet connectivity, a headlight activation, a communication module (e.g., telephonic devices), a multimedia electronic device, and/or the like. The data storage device 225, which may generally be a storage medium, may contain one or more data repositories for storing data that is received and/or generated. The data storage device 225 may be any physical storage medium, including, but not limited to, a hard disk drive (HDD), solid-state memory, removable storage, and/or the like. While the data storage device 225 is depicted as a local device, it should be understood that the data storage device 225 may be a remote storage device, such as, for example, a server computing device, cloud based storage device, or the like.

The memory component 240 may be configured as a volatile and/or a nonvolatile computer-readable medium and, as such, may include random access memory 242 (including SRAM, DRAM, and/or other types of random access memory), read only memory (ROM) 244, flash memory, registers, compact discs (CD), digital versatile discs (DVD), and/or other types of storage components. The memory component 240 may include one or more programming instructions thereon that, when executed by the processing device 205, cause the processing device 205 to complete various processes. The programming instructions stored on the memory component 240 may be embodied as a plurality of software logic modules, where each logic module provides programming instructions for completing one or more tasks, such as initiating control of the vehicle systems hardware 220 in response to selective actuation of the input apparatus 102.

Figure 6:
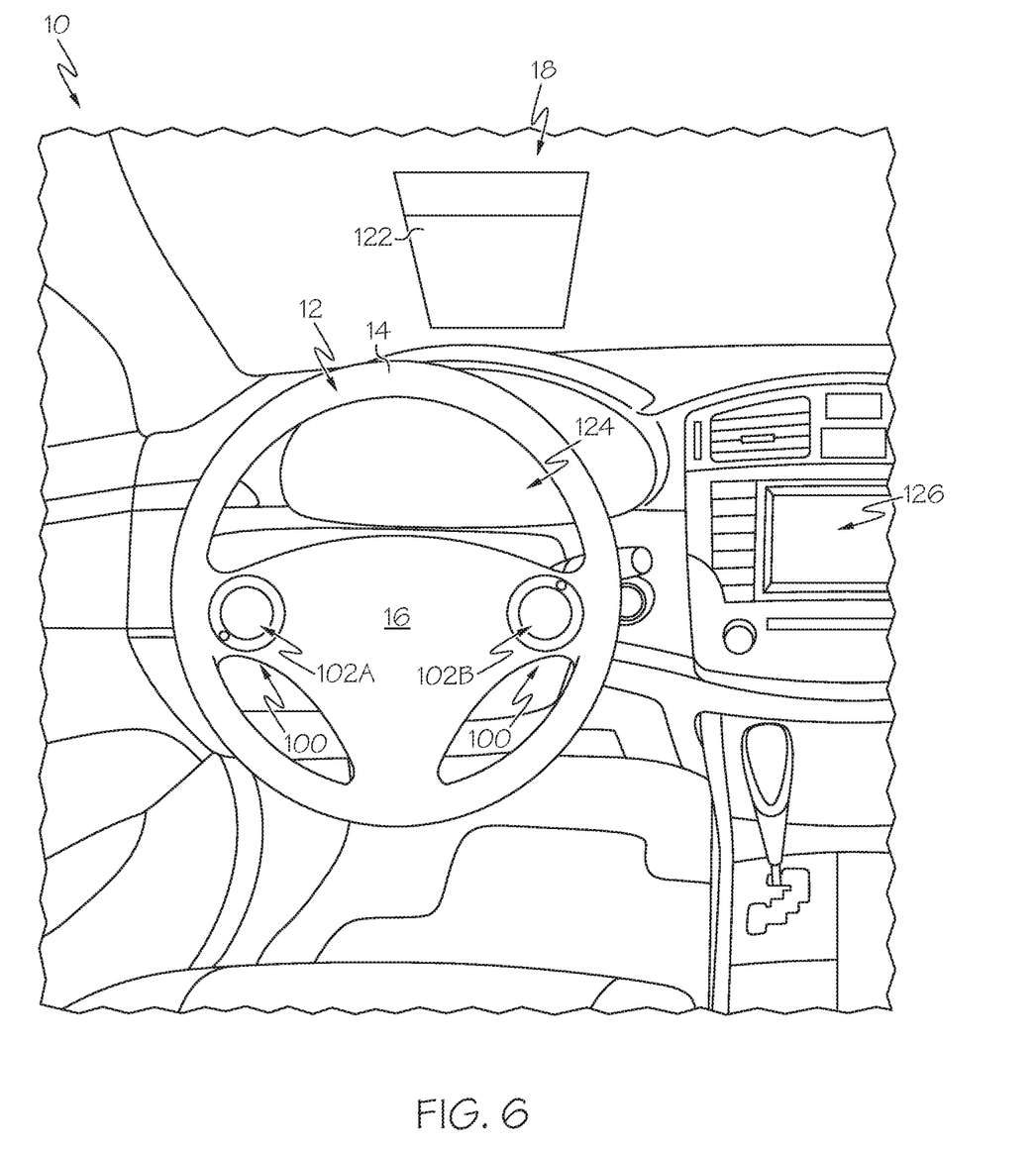

Referring now to FIG. 6 in conjunction with FIG. 5, one or more of the vehicle system hardware 220 may be controlled by an occupant of the vehicle 10 in response to receiving an input at the input hardware 110, and in particular at the one or more input apparatuses 102A, 102B. As mentioned above, the various components described with respect to FIG. 5 may be used to carry out one or more processes and/or provide functionality for controlling various vehicle systems in the vehicle 10. Illustrative examples of the various processes are described herein according to some embodiments. The various steps described herein are merely illustrative, such that additional, fewer or alternative steps are contemplated without departing from the scope of the present disclosure.

In the present example, the vehicle 10 includes a pair of input apparatuses 102A, 102B positioned along the center hub 16 of the steering wheel 12. In other embodiments, the pair of input apparatuses 102A, 102B may be positioned along various other surfaces and/or locations within a passenger cabin of the vehicle 10. An operator may utilize the pair of input apparatuses 102A, 102B to actuate one or more vehicle systems or devices in the vehicle 10. Further, an occupant may selectively control, navigate, adjust and manipulate a comprehensive list of settings, preferences, controls, options, data, functionality outputs, menus and the like of the one or more vehicle systems or devices with the pair of input apparatuses 102A, 102B. Initially, an input command may be received via at least one of the pair of input apparatuses 102A, 102B by actuating (i.e., contacting) the center dial 104A, 104B of the input apparatus 102A, 102B. It should be understood that in other embodiments an input command may be initially received by actuating the outer dial 106A, 106B in a particular direction (e.g., clockwise, counterclockwise, and the like).

Still referring to FIG. 6, the input apparatuses 102A, 102B are communicatively coupled to display hardware 120, and in particular to at least one of the heads-up display 122, the dashboard display 124, or the console display 126. The one or more programming instructions included in the memory component 240, when executed by the processing device 205, causes the processing device 205 to transmit corresponding information and data displayed on the display hardware 120 in response to an actuation of the center dial 104A, 104B of the input apparatus 102A, 102B. In instances, with either the heads-up display 122, the dashboard display 124, and/or the console display 126 (i.e., display hardware 120) displaying a plurality of vehicle systems hardware 220 included in the vehicle 10, actuation of the center dial 104A, 104B allows an occupant to navigate through the plurality of vehicle systems hardware 220. In particular, the one or more programming instructions included in the memory component 240, when executed by the processing device 205, causes the processing device 205 to detect an actuation (i.e., contact) against the center dial 104A, 104B of the input apparatus 102A, 102B. In the present example, the processing device 205 detects a relative direction of contact by an occupant (e.g., by a finger of an occupant) as is engaged and translated along the capacitive surface 105 of the center dial 104A, 104B. The one or more programming instructions executed by the processing device 205 causes data corresponding to the relative direction of contact to be transmitted via a signal to the display hardware 120 for purposes of displaying a real-time navigation/control of the plurality of vehicle systems hardware 220 with the input apparatus 102A, 102B.

For example, slidably translating a finger of an occupant in a relatively upward direction against the capacitive surface 105 of the center dial 104A, 104B may provide a corresponding activity (e.g., a scrolling action) on the heads-up display 122, the dashboard display 124, and/or the console display 126 communicating said data to the occupant. In this instance, an occupant may selectively navigate through the plurality of vehicle systems hardware 220 of the vehicle 10 by selectively contacting the capacitive surface 105 of the center dial 104A, 104B until identifying the vehicle systems hardware 220 desired to be controlled.

Still referring to FIG. 6, the one or more programming instructions included in the memory component 240, when executed by the processing device 205, causes the processing device 205 to initiate control of at least one of the vehicle systems hardware 220 in response to receiving an input command from the input apparatus 102A, 102B. For example, upon identifying the vehicle systems hardware 220 desired to be controlled, as verified along the display hardware 120, an occupant may actuate the input apparatus 102A, 102B by translating the center dial 104A, 104B toward the center hub 16 of the steering wheel 12 (i.e., depressing). In other embodiments, an occupant may actuate the input apparatus 102A, 102B by contacting the center dial 104A, 104B, such as, for example, tapping the capacitive surface 105 of the center dial 104A, 104B with a predetermined pattern (e.g., double tap). In this instance, the one or more programming instructions executed by the processing device 205 causes control of the vehicle system hardware 220 to commence such that an occupant of the vehicle 10 receives control of the various operabilities of the vehicle systems hardware 220. For example, translating the center dial 104A of the input apparatus 102A toward the center hub 16 of the steering wheel 12 may initiate control of a communication module (e.g., telephonic device) of the vehicle systems hardware 220 such that an occupant of the vehicle 10 thereby receives control of the various operabilities of the communication module.

The one or more programming instructions included in the memory component 240, when executed by the processing device 205, causes the processing device 205 to transmit a signal to the heads-up display 122, the dashboard display 124, and/or the console display 126 of the vehicle 10 in response to an occupant actuating the input apparatus 102A to select the particular vehicle systems hardware 220 to control (e.g., the communications module). In this instance, the heads-up display 122, the dashboard display 124, and/or the console display 126 may be dynamically updated to communicate information or data relating to the communications module for the occupant's review while determining a selective control of the communications module, such as, for example, of a plurality of settings, options, menus, functionality outputs, and the like. In this instance, continued actuation of the input apparatus 102A, such as, for example, a rotation of the outer dial 106A, provides the one or more programming instructions executed by the processing device 205 to cause for a navigation through the plurality of settings, preferences, data, menus, options, functionality outputs and the like of the communications module (i.e., the selected-vehicle system hardware 220). For instance, upon selecting control of the communications modules of the vehicle 10, a rotation of the outer dial 106A may provide an occupant an ability to navigate through a contact directory stored within the memory component 240, scroll through a historical record of recent communications conducted on the communication module, search for particular message data, and/or the like.

As the outer dial 106A is rotated about the center dial 104A and the rotation axis 101 of the input apparatus 102A, the one or more programming instructions executed by the processing device 205 causes the display hardware 120 (e.g., the heads-up display 122, dashboard display 124, console display 126, and/or the like) to dynamically update and generate a real-time observation display of the extensive settings, preferences, data, menus, options, and/or functionality outputs of the communications module. When the particular vehicle system setting desired to be controlled by an occupant is effectively arrived at (e.g., scrolled to), the one or more programming instructions executed by the processing device 205 causes detection of an actuation of the particular setting of the communications module when the outer dial 106A and/or the recessed portion 108A translates along the rotation axis 101. An operator may effectively select the desired setting to actuate by observing the corresponding information dynamically displayed along the display hardware 120 (e.g., the heads-up display 122, dashboard display 124, console display 126, and/or the like) of the vehicle 10 as the outer dial 106A is rotated. In other words, upon arriving to the desired setting and/or functionality output of the communication module (i.e., vehicle system hardware 220), an occupant translates the outer dial 106A of the input apparatus 102A at the recessed portion 108A in a direction parallel to the rotation axis 101 to thereby select the respective setting, thereby applying control of the particular setting of the communications module.

The above-described system includes components that provide multi-function input apparatuses for selective control and operation of one or more devices or systems of a vehicle (e.g., an HVAC device, an audio system, a visual interface or heads-up display, a communication module, and the like) at a central location within a passenger cabin of the vehicle. The multi-function input apparatus may be positioned along a steering wheel of the vehicle to facilitate ease of access for an occupant of the vehicle. A manual actuation of a center dial of the multi-function input apparatus, and specifically contacting a capacitive surface of the center dial, may provide a selective selection and activation of various vehicle systems. A manual actuation of an outer dial of the multi-function input apparatus, and specifically a particular direction of rotating and translating the outer dial, may further provide an elaborate navigation and/or control of a plurality of settings relative to the vehicle system actuated. The outer dial of the multi-function input apparatus may generally include a recessed portion that extends inwardly to improve a grasp and manipulation of the input apparatus.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-function input apparatus of a steering wheel comprising:
    an outer dial having a planar surface; and
    a center dial having a capacitive surface such that the center dial is responsive to capacitive touch along the capacitive surface, the center dial being disposed within the outer dial,
    wherein the outer dial is rotatable about a rotation axis independent of the center dial such that the center dial is rotatably fixed when the outer dial rotates, the outer dial including a recessed portion positioned along the planar surface such that the recessed portion is rotatable about the center dial, and
    wherein the recessed portion of the outer dial is translatable in a direction parallel to the rotation axis such that the recessed portion translates in the direction parallel to the rotation axis when the recessed portion is depressed.

2. The multi-function input apparatus of claim 1, wherein the center dial is translatable along the rotation axis independent of the recessed portion.

3. The multi-function input apparatus of claim 1, wherein the planar surface of the outer dial is positioned relatively above the capacitive surface of the center dial.

4. The multi-function input apparatus of claim 1, wherein the outer dial generates a tactile feedback in response to rotation of the recessed portion about the center dial.

5. The multi-function input apparatus of claim 1, wherein the outer dial is resiliently biased to inhibit rotation of the recessed portion about the center dial.

6. The multi-function input apparatus of claim 1, wherein contact with the capacitive surface of the center dial is configured to navigate through a plurality of vehicle systems.

7. The multi-function input apparatus of claim 6, wherein translation of the center dial along the rotation axis is configured to actuate at least one of the plurality of vehicle systems.

8. The multi-function input apparatus of claim 7, wherein rotation of the outer dial is configured to navigate through a plurality of settings of the at least one vehicle system.

9. The multi-function input apparatus of claim 8, wherein translation of the recessed portion of the outer dial along the rotation axis is configured to select at least one of the plurality of settings.

10. The multi-function input apparatus of claim 1, wherein the outer dial includes a capacitive surface positioned thereon such that the outer dial is responsive to conductive touch.

11. The multi-function input apparatus of claim 1, wherein the center dial is communicatively coupled to a display such that actuation of the center dial dynamically displays a plurality of vehicle systems along the display.

12. The multi-function input apparatus of claim 1, wherein the center dial and the outer dial are positioned on a center hub of the steering wheel adjacent to an outer rim of the steering wheel.

13. A steering wheel of a vehicle comprising:
    an outer rim;
    a center hub disposed within the outer rim; and
    an input apparatus positioned on the center hub, the input apparatus including an outer dial and a center dial disposed within the outer dial, the center dial including a haptic touch pad that is responsive to contact, the center dial being translatable toward the center hub,
    wherein the outer dial is rotatable about a rotation axis relative to and independent of the center dial, the outer dial is translatable in a direction parallel to the rotation axis independent of the center dial, and the outer dial includes a recessed portion that is depressed inwardly relative to the center dial,
    wherein a plurality of vehicle system are navigable in response to contact with the capacitive surface of the center dial and selectable in response to translation of the center dial, and
    wherein settings of the vehicle system are navigable in response to rotation of the recessed portion and selectable in response to translation of the recessed portion.

14. The steering wheel of claim 13, wherein the vehicle system comprises a Global Positioning System, an HVAC system, a communications module, or a display device.

15. The steering wheel of claim 13, wherein the center dial is communicatively coupled to a display such that the display communicates data indicative of the plurality of vehicle systems navigated in response to contact with the capacitive surface.

16. The steering wheel of claim 15, wherein the outer dial is communicatively coupled to the display such that the display communicates data indicative of the plurality of settings navigated in response to rotation of the recessed portion.

17. A multi-function input apparatus of a vehicle comprising:
- a center dial positioned on a steering wheel of the vehicle, the center dial including a haptic touch pad that is selectively actuated in response to contact with the haptic touch pad;
- an outer dial positioned about the center dial such that the center dial is encapsulated by the outer dial, the outer dial being rotatable about a rotation axis about the center dial such that center dial is rotatably fixed relative to the outer dial when the outer dial rotates, the outer dial including a recessed portion that is rotatable simultaneously with the outer dial and depressible in a direction parallel to the rotation axis relative to the center dial;
- a processor; and
- non-transitory computer-readable medium storing computer-readable instructions that, when executed, cause the processor to:
  - actuate a vehicle system in response to the center dial receiving contact along the haptic touch pad;
  - navigate a plurality of settings of the vehicle system in response to the outer dial rotating independent of the center dial; and
  - selecting at least one of the plurality of settings in response to the recessed portion being depressed relative to the center dial.

18. The multi-function input apparatus of claim 17, wherein the computer-readable instructions, when executed, cause the processor to select at least one of the plurality of vehicle system in response to the center dial translating toward the steering wheel.

19. The multi-function input apparatus of claim 18, wherein the computer-readable instructions, when executed, cause the processor to adjust the at least one of the plurality of settings of the vehicle system in response to the outer dial rotating about the center dial.

20. The multi-function input apparatus of claim 17, wherein the computer-readable instructions, when executed, causes the processor to communicate the vehicle system and the plurality of settings via a display of the vehicle.

* * * * *